May 17, 1938.  H. S. GATES  2,117,879
ELECTRICAL APPARATUS
Filed Sept. 30, 1936  2 Sheets-Sheet 1
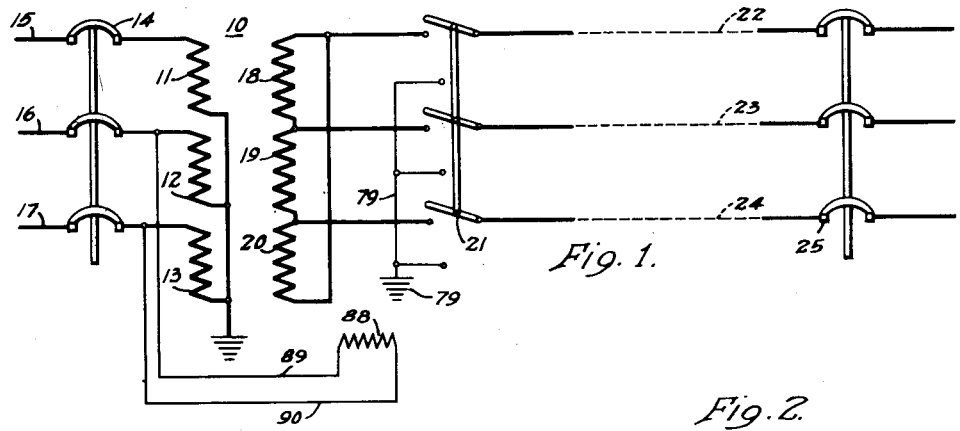
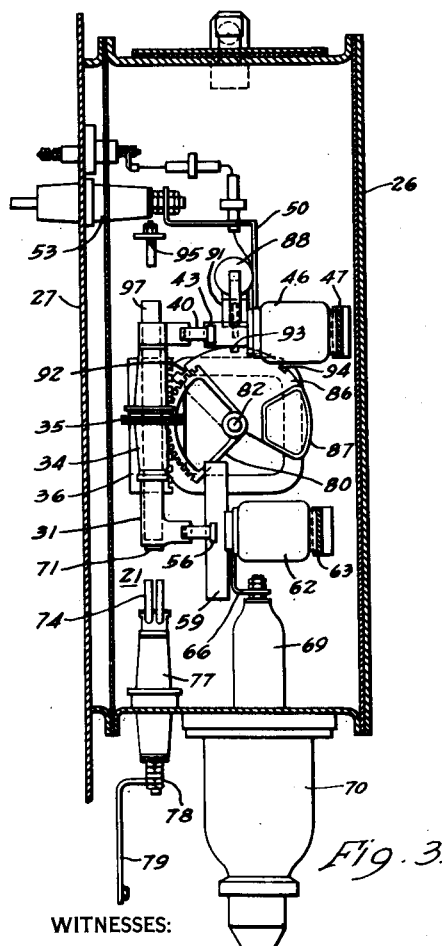
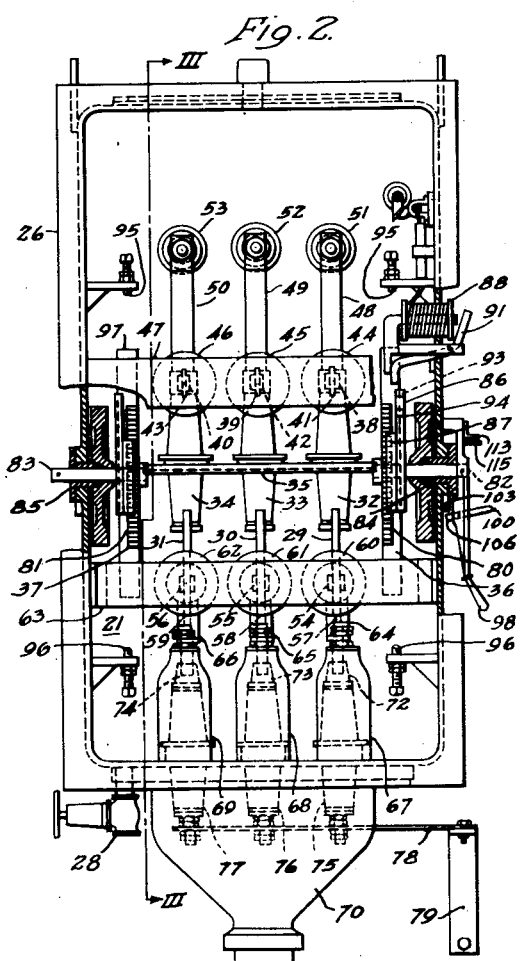
WITNESSES:
INVENTOR
Henry S. Gates.
BY
ATTORNEY May 17, 1938.                H. S. GATES                2,117,879
ELECTRICAL APPARATUS
Filed Sept. 30, 1936                2 Sheets-Sheet 2

WITNESSES:
Michael Stark
James N. Ely

INVENTOR
Henry S. Gates.
BY
Ezra W. Savage
ATTORNEY

Patented May 17, 1938

2,117,879

UNITED STATES PATENT OFFICE 2,117,879

ELECTRICAL APPARATUS

Henry S. Gates, Sharon, Pa., assignor to Westinghouse Electric & Manufacturing Company, East Pittsburgh, Pa., a corporation of Pennsylvania Application September 30, 1936, Serial No. 103,311

10 Claims. (Cl. 200—50)

This invention relates to electrical apparatus, and particularly to transformer grounding switches.

In the operation of electrical apparatus such as transformers, it is desirable to disconnect the transformer from the power circuit when repairs or changes are to be made and to so ground the feeder that the transformer is not again connected to the circuit until the repairs or changes have been made. It is also desirable to provide a grounding switch such as cannot be operated to its "ground position" when the transformer or feeder is energized.

Heretofore, different types of grounding switches have been developed whereby the switch cannot be operated to its "grounding position" when the transformer or feeder is energized. These grounding switches, however, require complicated mechanical and electrical locking and switching mechanisms for providing the desired operation from the disconnected or "open position" to the "grounding position."

An object of this invention is to provide a switch for connecting the conductors of an electrical circuit to the windings of an electrical apparatus or to ground and for disconnecting them therefrom and to provide for preventing the operation of the switch to its ground position when the apparatus is energized.

Another object of this invention is to provide a three-position grounding switch, the movable switching members of which are adapted for reciprocal movement in connecting the conductors of an electrical circuit to the windings of a transformer or to ground and for disconnecting them, and to provide for preventing a movement of the switch members to connect the conductors to the ground when the conductors are disconnected without first connecting the conductors to the transformer windings.

A further object of this invention is the provision in transformer grounding switches of an operating mechanism whereby a positive stop of the switch in the transformer position is secured during a movement of the switch from the disconnected or open circuit position to a ground position.

A further object of this invention is to provide for translating rotary movement into linear movement to reciprocally actuate the switch members of a three-position grounding switch in connecting the conductors of an electrical circuit to the windings of a transformer or to ground and for disconnecting them therefrom and to provide for preventing a movement of the switch members to connect the conductors to ground when the conductors are disconnected without first connecting the conductors to the transformer windings.

This application is a continuation-in-part of copending application Serial No. 62,663, filed February 6, 1936 and directed to Electrical apparatus.

This invention together with other objects will be better understood from the following description when taken in conjunction with the accompanying drawings, in which:

Figure 1 is a schematic view illustrating the three-phase transformer, its primary and secondary circuits and a three-phase grounding switch connected in one of the circuits;

Fig. 2 is an elevational view partly in section of a grounding switch and its operating mechanism mounted within a suitable switch casing, the front cover of which is shown removed;

Fig. 3 is a sectional view taken along the line III—III of Fig. 2, showing a portion of the switch and its operating mechanism;

Like reference numerals in the different figures of the drawings denote like parts.

Figure 4:
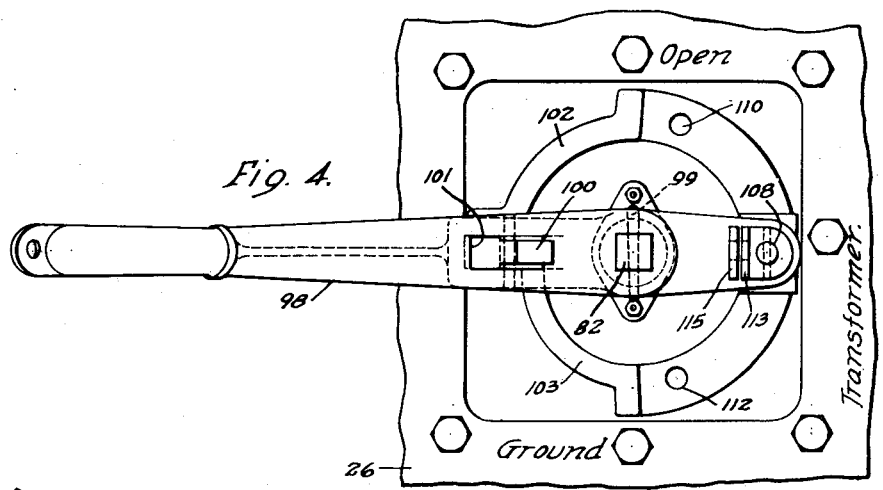
Fig. 4 is a plan view of a portion of the operating mechanism embodying the features of this invention.

This invention is illustrated as embodied in a circuit in which it is desired to protect an electrical apparatus such as a transformer.

Referring to the drawings, and Fig. 1 thereof in particular, this invention is illustrated in a circuit in which a transformer 10 having low voltage windings 11, 12 and 13 is connected by means of circuit breaker 14 to the three conductors of a low-voltage three-phase circuit 15, 16 and 17. The high voltage windings 18, 19 and 20 of the transformer 10 are connected through a three-phase grounding switch, shown generally at 21, to high-voltage feeder conductors 22, 23 and 24, and through the circuit breaker 25 to a high-voltage power supply source.

In this embodiment, the actuating mechanism and switch members of the grounding switch 21 are positioned in the enclosing case 26 as shown in Figs. 2 and 3. The enclosing case is suitable for mounting on the case 27 of a transformer, as shown in Fig. 3, or on a wall. In practice, the bottom, sides, back, front and top of the case are so fabricated that the assembled case is leak proof and suitable for containing an insulated liquid where desired. A valve 28 may be positioned in the bottom of the case 26 for withdrawing the insulating liquid in which the grounding switch is ordinarily immersed.

The grounding switch 21 is provided with three movable switch members 29, 30 and 31 carried in bushings 32, 33 and 34, respectively, which are suitably mounted on a bushing bridge 35. The ends of the bushing bridge 35 are attached in a suitable manner to racks 36 and 37, respectively, the racks being so mounted in guides (not shown) in the case that they are disposed for reciprocating movement when actuated, as hereinafter described.

The upper ends of the movable switch members 29, 30 and 31 are provided with terminals 38, 39 and 40 that are adapted to slidingly engage transformer terminal contact members 41, 42 and 43, respectively. The contact members 41, 42 and 43 are mounted on insulating bushings 44, 45 and 46 that are suitably mounted on the bushing bridge 47, the ends of which are bolted or otherwise permanently attached to the walls of the case 26.

As shown in Fig. 2, the contact members 41, 42 and 43 are suitably connected as by conductor straps 48, 49 and 50 through the terminal bushings 51, 52 and 53 that extend through the back of the case 26 and the transformer case 27 containing the windings 18, 19 and 20 to which the transformer terminal contact members 41, 42 and 43 are connected.

The lower ends of the movable switch members 29, 30 and 31 are provided with terminals 54, 55 and 56 that are adapted to slidingly engage line terminal contact members 57, 58 and 59, respectively. The contact members 57, 58 and 59 are carried by insulating bushings 60, 61 and 62, respectively, that are suitably mounted on the bushing bridge 63, the ends of which are bolted to the walls of the case 26. The contact members 57, 58 and 59 are connected by conductor straps 64, 65 and 66, respectively, through the line terminal bushings 67, 68 and 69 mounted in the bottom of the case and through the main line terminal bushing 70 to the conductors 22, 23 and 24 of the power source.

In order that the movable switch members 29, 30 and 31 may be electrically connected at all times to the conductors 22, 23 and 24, the line terminal contact members 57, 58 and 59 are in the form of an elongated knife switch of such a length that at no time during a movement of the movable switch members 29, 30 and 31 will the sliding electrical engagement between the contact members 54, 55 and 56 and the line terminal contact members 57, 58 and 59, respectively, be broken.

In order to ground the conductors 22, 23 and 24, when the transformer 10 is not energized, contact members 71, adapted to engage the ground terminal contact members 72, 73 and 74 when the switch is actuated to "ground position," are provided on the lower end of movable switch members 29, 30 and 31. The ground terminal contact members 72, 73 and 74 are carried by the insulating bushings 75, 76 and 77 suitably mounted through the bottom of the case 26 and are electrically connected therethrough to the short circuiting bar 78 and the common ground 79.

In order to actuate the racks 36 and 37 to move the movable switch members 29, 30 and 31, gear sectors 80 and 81 adapted to engage the racks 36 and 37, respectively, are suitably mounted on shafts 82 and 83 mounted through stuffing glands 84 and 85, respectively, positioned in the sides of the case 26. A segment 86 provided with a counter-balance wheel 87 to counter-balance the weight of the gear sector 80 and to provide for maintaining the movable switch members 29, 30 and 31 in a desired position, is also provided on the shafts 82 and 83.

In order to lock the movable switch members 29, 30 and 31 to close a circuit from the line terminal contact members to the transformer terminal contact members when the transformer 10 is energized, an electrical interlock 88 is provided in the case. The windings of the interlock are electrically connected through conductors 89 and 90, as viewed in Fig. 1, to the transformer 10.

As shown in Figs. 2 and 3, the armature 91 of the interlock 88 is in the form of an extended arm. When the transformer and consequently, the windings of the interlock are energized, the armature 91 is adapted to engage one of the grooves 92, 93 and 94, disposed about the periphery of the segment 86 to lock the actuating mechanism.

Adjustable stops 95 and 96 are provided in the case to limit the path of the movement of the movable switch members 29, 30 and 31 in response to a movement of the actuating mechanism, a rod 97 being provided on the racks 36 and 37 and projecting above and below the racks for abutting the stops 95 and 96 when the movable switch members are in "open position" and "ground position," respectively.

Figure 5:
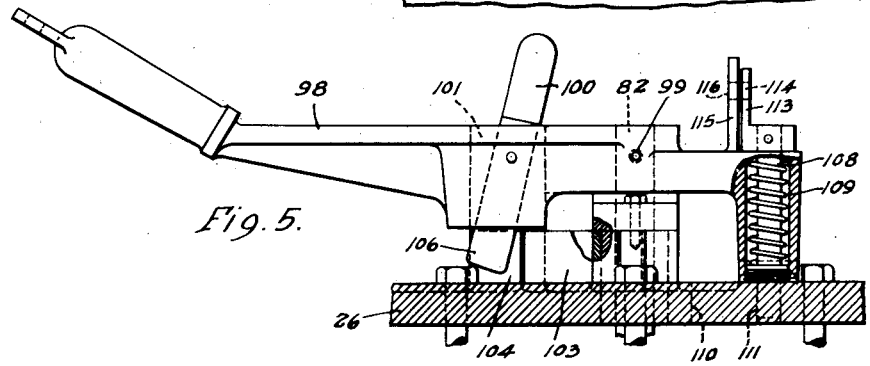
Fig. 5 is an elevational view, partly in section, of the operating mechanism shown in Fig. 4.

In order to rotate the shafts 82 and 83 to cause a movement of the switch members 29, 30 and 31, a handle 98 may be carried on the end of either of the shafts 82, 83 and may be suitably keyed thereto by means of the pin 99, as shown in Figs. 4 and 5. The operating handle 98 may be of any suitable type to cause a positive stop of the switch members 29, 30 and 31 in the transformer position during a movement of the switch members from the open circuit position to the ground position, or from the ground position to the open circuit position. It is desired to employ a handle which will provide a positive stop of the switch members 29, 30 and 31, in the transformer position in order that a suitable time interval is provided in which the electrical interlock 88 may be energized and the armature 91 may be actuated to enter groove 93 of the segment 86 if the transformer is energized to lock the switch members 29, 30 and 31 in the transformer position.

In the preferred modification of the operating handle 98, as shown in Figs. 4 and 5, a pivotally mounted lever 100 is disposed in an opening 101 in the arm of the operating handle 98 for engaging stops 102 and 103, disposed on the case or housing when the switch members 29, 30 and 31 are in the transformer position.

Figure 6:
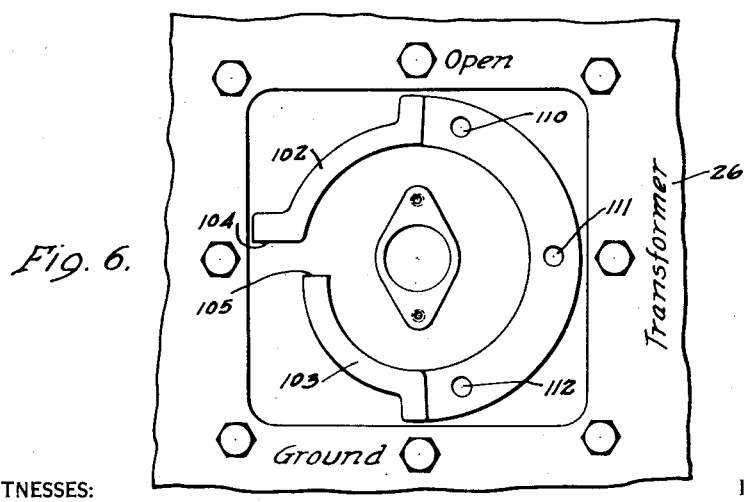
Fig. 6 is a plan view of a portion of the operating mechanism shown in Fig. 4.

Stops 102 and 103 are disposed on the housing, as shown in Fig. 6 with their adjacent ends 104 and 105 respectively, out of alignment, so that as the operating handle is moved from the open position to the ground position, the end 106 of the lever 100 strikes the end 104 of the stop 102 to provide a positive stop in the movement of the operating handle 98 to the ground position. In order to move the operating handle 98 to the ground position from the transformer position, the lever 100 must be thrown from the position shown in Fig. 5, to the position in which the lever clears the end 104 of the stop 102.

With the lever in this position, the operating handle may be moved to the ground position.

In order to insure the stopping of the operating handle 98 at each of the open, transformer and ground positions, a plunger 108 is suitably mounted in the end of the operating handle 98 and biased by means of a spring 109 disposed thereabout to engage openings 110, 111 and 112, disposed in the housing at the open, transformer and ground positions, respectively. The spring biased plunger 108 may be manually withdrawn from its engagement with the openings 110, 111 and 112 to permit movement of the handle 98 to a desired position. In order that the operating handle may be locked in any one of the three positions, a lug 113 having an opening 114 therein, is keyed to the plunger 108 to cooperate with the lug 115 carried by the operating handle 98. An opening 116 is provided in the lug 115 for so cooperating with the opening 114 in the plunger lug that when the plunger engages any one of the openings 110, 111 and 112, a lock may be fitted through the openings 114 and 116 to prevent the withdrawal of the plunger 108 from the openings in the case.

As viewed in Figs. 2 and 3 of the drawings, the three-position grounding switch 21 is in transformer position. That is, the movable switch members 29, 30 and 31 bridge the line terminal contact members 57, 58 and 59 and the transformer terminal contact members 41, 42 and 43, respectively, to close a circuit from the power source to the transformer 10 through the circuit breaker 25 and conductors 22, 23 and 24. In this position, the windings of the electrical interlock 88 are energized and the armature 91 is actuated to enter groove 93 of the segment 86 to lock the actuating mechanism in the transformer position.

In order to actuate the switch members 29, 30 and 31 to either the "ground position" wherein the movable switch members bridge the line terminal contact members 57, 58 and 59 and the ground terminal contact members 72, 73 and 74 to ground, or to the disconnect position in which the rod 97 abuts the stop 95, circuit breakers 14 and 25 must be opened to deenergize the transformer 10 and deenergize the windings of the interlock 88.

When the windings of the interlock 88 are deenergized, the armature arm 91 is withdrawn from groove 93 and the movable switch members 29, 30 and 31 may be moved to the disconnect position by manually operating the handle 98 to rotate the shafts 82 and 83. In order to move the operating handle 98 to the disconnect or open position, the spring biased plunger 108 must be first withdrawn from the opening 111 in the housing and the lever 100 must be thrown to the position where its end clears the stop 103. In moving the handle 98 to the open position, the shafts 82 and 83, as shown in Fig. 3, rotate in a clockwise direction to cause the segments 86 and the gear sectors 80 and 81 to rotate in a clockwise direction to actuate the racks 36 and 37 to move in a vertical direction in their guides (not shown).

The linear movement of the racks 36 and 37 causes the assembly of the movable switch members 29, 30 and 31 on the bushing bridge 35 to so move in a vertical direction that the contact members 38, 39 and 40 on the upper ends of the movable switch members disengage the transformer terminal contact members 41, 42 and 43, respectively, the contact members 54, 55 and 56 on the lower end of the movable switch members maintaining their electrical engagement with the line terminal contact members 57, 58 and 59. The vertical movement of the movable switch members to the "disconnect position" is limited as hereinbefore described by the stops 95 positioned on the walls of the case 26.

In operation, when it is desired to ground the feeder to a transformer, the spring biased plunger 108 is withdrawn from the opening 112 in the housing, and the handle 98 is actuated to rotate the shafts 82 and 83 in a counter-clockwise direction, as viewed in Fig. 3, to actuate the movable switch members from their disconnect position hereinbefore described.

In moving from the disconnect or open circuit position to the ground position, the movable switch members move progressively from the open circuit position to and through the transformer position to the ground position.

As the operating handle is moved from the open position toward the transformer position, the spring-biased plunger 108 rides on the housing until the operating handle 98 is in transformer position, where the end 106 of lever 100 strikes the end 104 of stop 102, providing a positive stop of the switch members 29, 30 and 31 in the transformer position. In this position, the plunger 108 is biased to engage the opening 111 in the housing 26. To continue the movement of the operating handle 98 to the ground position, the lever 100 must be thrown from the position shown in Fig. 5 to a position where it clears the end 104 of stop 102, and the plunger 108 must be manually withdrawn from its engagement with the opening 111 in the housing.

If either of the circuit breakers 14 and 25 are closed when the movable switch members are moved to the transformer position, the transformer 10 and the windings of the electrical interlock 88 become so energized during the time interval necessary to manually operate the lever 100 and plunger 108 carried by the handle 98 that the armature 91 of the interlock is moved into the groove 93 of the segment 86 to lock the switch in transformer position. Thus before the handle can be moved from the transformer position to the ground position to actuate the switch members to the ground position, circuit breakers 14 and 25 must be opened deenergizing the transformer 10 and the windings of the electrical interlock 88.

When the interlock 88 is thus deenergized and the plunger 108 and lever 100 are in the positions indicated, the shafts 82 and 83 may be rotated in a counter-clockwise direction, as viewed in Fig. 3, to actuate the movable contact members to the ground position where contact members 71 on the lower ends of the movable switch members 29, 30 and 31 engage the ground terminal contact members 72, 73 and 74 to close a circuit from the conductors 22, 23 and 24 to the ground 79.

In order to move the switch members 29, 30 and 31 from the ground position to the open circuit position, the plunger 108 is withdrawn from the opening 112 in the case or housing 26 and the handle 98 is moved to the transformer position where the end 106 of lever 100 strikes the end 105 of stop 103. In order to move the switch members 29, 30 and 31 from the transformer position when the transformer 10 is not energized, the lever 100 must be actuated to so move the end 106 of the lever to clear the end 105 of stop 103 to the position shown in Fig. 5. With the lever in this position and plunger 108 withdrawn from opening 111 in the housing, the handle may be actuated to move the switch members 29, 30 and 31 to the open circuit position if the transformer 10 is not energized.

It is thus evident that with the grounding switch of this invention, the feeder cannot be grounded until after the transformer is deenergized. It is further evident that the mechanism of the grounding switch hereinbefore described is such that the desired positions of the switch may be obtained through reciprocal movement of the movable contact members and that the desired operation of connecting in transformer position before entering ground position from an open circuit or disconnect position is attained without the aid of mechanical sequence enforcing interlocks.

By providing operating mechanism in which a positive stop of the switch members is obtained in the transformer position as the switch members are moved from the open circuit position to the ground position, or the ground position to the open circuit position, as hereinbefore described, a grounding switch is provided in which a suitable time interval is provided at the transformer position during the movement of the switch members to insure operation of the electrical interlock to prevent further movement of the grounding switch if the transformer is energized. Further, a positive stop is provided for the mechanism in each of the transformer, open circuit and ground positions, thereby preventing a haphazard operation of the grounding switch.

Further advantages are obtained in the grounding switch of this invention by translating rotary movement necessary in actuating the mechanism into linear movement to obtain the reciprocating movement of the movable switch members, since the actuating mechanism may thereby be simplified. By providing the reciprocating movement, the movable contact members can be operated from their open circuit or disconnect position only in a direction to close the switch in its transformer position, from which position it cannot be operated to the ground position unless the transformer is deenergized. This progressive movement of the movable switch members accomplishes the desired result of preventing the operation of the switch from its open circuit position except toward its transformer position.

Although this invention has been described with reference to a particular embodiment thereof, other and various modifications thereof are possible. It is, therefore, not to be restricted except insofar as is necessitated by the prior art and the scope of the appended claims.

I claim as my invention:

1. In a transformer grounding switch, in combination, a transformer terminal contact member, a line terminal contact member, a ground contact member, a switch disposed for movement to electrically connect the line terminal contact member to the transformer terminal contact member or the line terminal contact member to the ground contact member, the switch being also disposed for movement to open circuit position where it does not bridge a plurality of contact members, means for actuating the switch member, the ground and line terminal contact members being so disposed that as the switch is moved progressively from open circuit position it bridges the transformer and line terminal contact members and then ground and line terminal contact members which positions are generally designated transformer and ground positions, respectively, means cooperative with the switch actuating means for providing a positive stop in the progressive movement of the switch member at the transformer position as the switch member is moved from the open circuit position to ground position, and means cooperative to lock the switch member in transformer position when the switch is stopped at the transformer position if the transformer is energized.

2. In a transformer grounding switch for electrically connecting the transformer to line or line to ground, in combination, a plurality of contact members, the contact members being electrically connected to ground, line and transformer respectively, a switch member for bridging the contact members disposed for reciprocating movement to different positions including an open circuit position where it does not bridge a plurality of contact members, means for actuating the switch member, said actuating means being disposed to move the switch member progressively from the open circuit position to bridge the line and transformer contact members and then bridge the line and ground contact members, which positions are generally designated transformer and ground positions, respectively, means cooperative with said actuating means for providing a positive stop in the progressive movement of the switch member in the transformer position, and means cooperative to lock the switch member in the transformer position when the switch member is positively stopped in the transformer position if the transformer is energized to prevent movement of the switch member to ground position.

3. In a transformer grounding switch for electrically connecting the transformer to line or line to ground, in combination, a plurality of contact members, the contact members being electrically connected to ground, line and transformer, respectively, a switch member for bridging the contact members disposed for reciprocating movement to different positions including an open circuit position where it does not bridge a plurality of contact members, means for actuating the switch member, said actuating means being disposed to move the switch member progressively from the open circuit position to bridge the line and transformer contact members and then bridge the line and ground contact members, which positions are generally designated transformer and ground positions, respectively, means cooperative with said actuating means for providing a positive stop in the progressive movement of the switch member in the transformer position, means cooperative to lock the switch member in the transformer position when the switch member is positively stopped in the transformer position if the transformer is energized to prevent movement of the switch member to ground position, and means disposed between the actuating means and switch member for translating rotary movement into linear movement.

4. In a transformer grounding switch for electrically connecting the transformer to line or line to ground, in combination, a plurality of contact members, the contact members being electrically connected to ground, line and transformer, respectively, a switch member for bridging the contact members disposed for reciprocating movement to different positions including an open circuit position where it does not bridge a plurality of contact members, means for actuating the switch member, said actuating means being disposed to move the switch member progressively from the open circuit position to bridge the line and transformer contact members and then bridge the line and ground contact members, which positions are generally designated transformer and ground positions, respectively, means cooperative with said actuating means for providing a positive stop in the progressive movement of the switch member in the transformer position, means co-operative to lock the switch member in the transformer position when the switch member is positively stopped in the transformer position if the transformer is energized to prevent movement of the switch member to ground position, and means comprising a rack and a gear segment cooperating therewith disposed between the actuating means and switch member for translating rotary movement into linear movement.

5. In a transformer grounding switch, in combination, a transformer terminal contact member, a line terminal contact member, a ground contact member, a switch disposed for movement to electrically connect the line terminal contact member to the transformer terminal contact member or the line terminal contact member to the ground contact member, the switch being also disposed for movement to open circuit position where it does not bridge a plurality of contact members, means for limiting the extent of the movement of the switch member in the direction of the open circuit position, the transformer terminal contact member being disposed between the limiting means and the ground contact member, means for so actuating the switch member that it progressively moves from the open circuit position to bridge the transformer and line terminal contact members and then bridge the ground and line terminal contact members, which positions are generally designated transformer and ground positions, respectively, means cooperative with the switch actuating means for providing a positive stop in the progressive movement of the switch member at each of the open circuit, transformer and ground positions as the switch member is moved from the open-circuit position to ground position, and means cooperative with the actuating means to lock the switch member in transformer position when the switch is stopped at the transformer position if the transformer is energized.

6. In a transformer grounding switch for electrically connecting the transformer to line or line to ground, in combination, a plurality of contact members, the contact members being electrically connected to ground, line and transformer, respectively, a switch member for bridging the contact members disposed for reciprocating movement to different positions including an open circuit position where it does not bridge a plurality of contact members, means for limiting the extent of the movement of the switch member in the direction of the open circuit position, the contact member connected to the transformer being disposed between the limiting means and the contact member connected to the ground, means for actuating the switch member, said actuating means being disposed to move the switch member progressively from the open circuit position to bridge the contact members electrically connected to the transformer and line, respectively, and then to bridge the contact members electrically connected to the ground and line respectively, which positions are generally designated transformer and ground positions, respectively, means cooperative with said actuating means for providing a positive stop in the progressive movement of the switch member in the transformer position, and means cooperative to lock the switch member in the transformer position when the switch member is positively stopped in the transformer position if the transformer is energized to prevent movement of the switch member to ground position.

7. In a transformer grounding switch for electrically connecting the transformer to line or line to ground, in combination, a plurality of contact members, the contact members being electrically connected to ground, line and transformer, respectively, a switch member for bridging the contact members disposed for reciprocating movement to different positions including an open circuit position where it does not bridge a plurality of contact members, means for limiting the extent of the movement of the switch member in the direction of the open circuit position, the contact member connected to the transformer being disposed between the limiting means and the contact member connected to the ground, means for actuating the switch member, said actuating means being disposed to move the switch member progressively from the open circuit position to bridge the contact members electrically connected to the transformer and line, respectively, and then to bridge the contact members electrically connected to the ground and line, respectively, which positions are generally designated transformer and ground positions, respectively, means cooperative with said actuating means for providing a positive stop in the progressive movement of the switch member in the transformer position, means cooperative to lock the switch member in the transformer position when the switch member is positively stopped in the transformer position if the transformer is energized to prevent movement of the switch member to ground position, and means disposed between the actuating means and switch member for translating rotary movement into linear movement.

8. In a transformer grounding switch disposed to be moved from an open circuit position through a transformer position to a ground position, a housing for the switch, a shaft rotatably mounted in the housing for actuating the switch, a handle carried by the shaft for manually operating the switch, stops carried by the housing for providing a positive stop of the switch in the transformer position as the switch is moved from the open circuit position to the ground position or from the ground position to the open circuit position, a lever pivotally carried by the operating handle for engaging the stops when the switch is in the transformer position, one of the stops being disposed to be engaged by the lever when the switch is moved from the open circuit position to the transformer position to prevent further movement of the switch to the ground position until the lever is actuated to a position where it clears said one of the stops, another of the stops being disposed to be engaged by the lever when the switch is moved from the ground position to the transformer position to prevent further movement of the switch to the open circuit position until the lever is actuated to a position where it clears said other stop, and a plunger carried by the operating handle and disposed to engage the housing to prevent movement of the switch from the transformer position to either the ground or open circuit position, the plunger being disposed to be manually actuated to disengage the housing to permit movement of the switch from the transformer position.

9. In a transformer grounding switch disposed to be moved from an open circuit position through a transformer position to a ground position, a housing for the switch, a shaft rotatably mounted in the housing for actuating the switch, a handle carried by the shaft for manually operating the switch, stops carried by the housing for providing a positive stop of the switch in the transformer position as the switch is moved from the open circuit position to the ground position or from the ground position to the open circuit position, a lever pivotally carried by the operating handle for engaging the stops when the switch is in the transformer position, one of the stops being disposed to be engaged by the lever when the switch is moved from the open circuit position to the transformer position to prevent further movement of the switch to the ground position until the lever is actuated to a position where it clears said one of the stops, another of the stops being disposed to be engaged by the lever when the switch is moved from the ground position to the transformer position to prevent further movement of the switch to the open circuit position until the lever is actuated to a position where it clears said other stop, and means for preventing movement of the switch from the transformer position to either the ground or open circuit position, said means including a plunger carried by the operating handle biased to engage the housing, the plunger being disposed to be manually actuated to disengage the housing to permit movement of the switch from the transformer position.

10. In a transformer grounding switch disposed to be moved from an open circuit position through a transformer position to a ground position, a housing for the switch, a shaft rotatably mounted in the housing for actuating the switch, a handle carried by the shaft for manually operating the switch, stops carried by the housing for providing a positive stop of the switch in the transformer position as the switch is moved from the open circuit position to the ground position or from the ground position to the open circuit position, a lever pivotally carried by the operating handle for engaging the stops when the switch is in the transformer position, one of the stops being disposed to be engaged by the lever when the switch is moved from the open circuit position to the transformer position to prevent further movement of the switch to the ground position until the lever is actuated to a position where it clears said one of the stops, another of the stop being disposed to be engaged by the lever when the switch is moved from the ground position to the transformer position to prevent further movement of the switch to the open circuit position until the lever is actuated to a position where it clears said other stop, and a plunger carried by the operating handle biased to engage the housing when the switch is in any one of the open, transformer or ground positions to prevent free movement of the switch to the other positions, the plunger being disposed to be manually actuated to disengage the housing to permit movement of the switch.

HENRY S. GATES.